US012364282B2

(12) United States Patent
Hijma et al.

(10) Patent No.: US 12,364,282 B2
(45) Date of Patent: Jul. 22, 2025

(54) HEATER PLATES

(71) Applicant: JT International SA, Geneva (CH)

(72) Inventors: Herman Hijma, Kampen (NL); Paul Voerman, Apeldoorn (NL); Marijn Leneman, Zwolle (NL)

(73) Assignee: JT International S.A. (CH)

( * ) Notice: Subject to any disclaimer, the term of this patent is extended or adjusted under 35 U.S.C. 154(b) by 513 days.

(21) Appl. No.: 17/773,698

(22) PCT Filed: Oct. 27, 2020

(86) PCT No.: PCT/EP2020/080166
§ 371 (c)(1),
(2) Date: May 2, 2022

(87) PCT Pub. No.: WO2021/083888
PCT Pub. Date: May 6, 2021

(65) Prior Publication Data

US 2022/0378102 A1 Dec. 1, 2022

(30) Foreign Application Priority Data

Oct. 31, 2019 (EP) .................................... 19206623

(51) Int. Cl.
*A24F 40/46* (2020.01)
*A24F 40/10* (2020.01)
(Continued)

(52) U.S. Cl.
CPC .............. *A24F 40/46* (2020.01); *A24F 40/10* (2020.01); *A24F 40/42* (2020.01); *A24F 40/44* (2020.01); *A24F 40/485* (2020.01); *H05B 3/22* (2013.01)

(58) Field of Classification Search
CPC ........... A24F 40/46; A24F 40/42; A24F 40/44
See application file for complete search history.

(56) References Cited

U.S. PATENT DOCUMENTS

2014/0261408 A1* 9/2014 DePiano ................. A24F 40/46 128/202.21
2019/0099561 A1 4/2019 Nettenstrom
2021/0259310 A1* 8/2021 Qiu ......................... A24F 40/42

FOREIGN PATENT DOCUMENTS

CN 209518262 U 10/2019
EP 3178335 A1 6/2017

OTHER PUBLICATIONS

International Search Report for Application No. PCT/EP2020/080166 mailed Dec. 17, 2020, pp. 1-5.

* cited by examiner

*Primary Examiner* — Michael H. Wilson
*Assistant Examiner* — Jennifer A Kessie
(74) *Attorney, Agent, or Firm* — Lerner David LLP

(57) ABSTRACT

A cartridge for an electronic cigarette comprises: a liquid store arranged to contain a liquid to be vaporised; a vaporization chamber having at least one opening arranged to connect the vaporization chamber to the liquid store; a vaporising unit; and a pair of electric terminals connected to the heating element. The vaporising unit comprises: a fluid transfer element arranged to transfer liquid between the liquid store and the vaporization chamber; and a heating element arranged inside the vaporization chamber and arranged to heat a liquid transferred to the vaporization chamber by the fluid transfer element. The pair of electric terminals comprise a first connection plate and a second connection plate which are connected to a first end and a second end of the heating element, respectively, and the first and the second connection plates are arranged on a first side of the vaporization chamber.

19 Claims, 9 Drawing Sheets

(51) Int. Cl.

| | |
|---|---|
| ***A24F 40/42*** | (2020.01) |
| ***A24F 40/44*** | (2020.01) |
| ***A24F 40/485*** | (2020.01) |
| ***H05B 3/22*** | (2006.01) |

HEATER PLATES

CROSS-REFERENCE TO RELATED APPLICATIONS

The present application is a national phase entry under 35 U.S.C. § 371 of International Application No. PCT/EP2020/080166, filed on Oct. 27, 2020, published in English, which claims priority from European Application No. 19206623.1 filed Oct. 31, 2019, the disclosures of all of which are incorporated herein by reference.

FIELD OF INVENTION

The present invention relates to heater plates for electronic cigarettes.

BACKGROUND

Electronic cigarettes are an alternative to conventional cigarettes. Instead of generating a combustion smoke, they vaporize a liquid, which can be inhaled by a user. The liquid typically comprises an aerosol-forming substance, such as glycerin or propylene glycol that creates the vapor. Other common substances in the liquid are nicotine and various flavorings.

The electronic cigarette is a hand-held inhaler system, comprising a mouthpiece section, a liquid store, and a power supply unit. Vaporization is achieved by a vaporizer or heater unit which typically comprises a heating element in the form of a heating coil and a fluid transfer element, such as a wick, arranged to transfer fluid from the liquid store to the heating element. Vaporization occurs when the heater heats up the liquid in the fluid transfer element until the liquid is transformed into vapor. The vapor can then be inhaled via an air outlet in the mouthpiece.

The electronic cigarette may comprise a cartridge seating which is configured to receive disposable consumables in the form of cartridges. Cartridges comprising the liquid store and the vaporizer are often referred to as "cartomizers". In this case, the vaporizer of the cartomizer is connected to the power supply unit when received in the cartridge seating such that electricity can be supplied to the heater of the cartomizer to heat the liquid to generate the vapor. Often some form of mechanical mechanism is used to retain the cartridge in the cartridge seating such that it does not fall out and separate from the device.

In order to transfer liquid from the liquid store to the heating element, the wick must be arranged between the liquid store and vaporization chamber such that, when the wick is heated, capillary action transports liquid through the porous structure of the wick from the liquid store to the hating element.

It is an object of the present invention to provide an electronic cigarette which has a simplified structure and is easy to assemble.

SUMMARY OF INVENTION

According to a first aspect there is provided a cartridge for an electronic cigarette, the cartridge comprising a liquid store arranged to contain a liquid to be vaporised, a vaporization chamber having at least one opening arranged to connect the vaporization chamber to the liquid store, and a vaporising unit. The vaporising unit comprises a fluid transfer element arranged to transfer liquid between the liquid store and the vaporization chamber and a heating element arranged inside the vaporization chamber and arranged to heat a liquid transferred to the vaporization chamber by the fluid transfer element. A pair of electric terminals are connected to the heating element, wherein the pair of electric terminals comprise a first connection plate and a second connection plate which are connected to a first end and a second end of the heating element respectively, and wherein the first and the second connection plates are arranged on a first side of the vaporization chamber.

Both of the connection plates are therefore on the same side of the vaporisation chamber. Preferably, the first and the second connection plates may be arranged on a first side of the fluid transfer element. This arrangement avoids having the first connection plate on a first side of the fluid transfer element and the second connection plate on the other side of the fluid transfer element. Advantageously, this configuration allows for a more simplified cartridge which is easier to construct. This is because the manufacturer does not need to be concerned about the size of the gap i.e. the horizontal distance, between the first and second connection plates in order that the fluid transfer element can be provided between the two connection plates. Here, horizontal distance is referring to a distance measured perpendicular to a longitudinal axis of the cartridge, when the cartridge is held in the horizontal position. Instead, the connection plates are both arranged to one side of the vaporisation chamber and the fluid transfer element is located within a substantial central portion of the vaporisation chamber. Positioning both connection plates, which may also be referred to as electrodes, on one side of the vaporisation chamber saves space within the cartridge. Advantageously, having both electrodes located on one and the same side means that space can be freed up on the opposite side, which allows the device to be thinner overall as a result. Thus, the overall device can be made more compact, and therefore smaller.

The first side may be along a longitudinal extension of the fluid transfer element. The connection plates therefore contact first and second ends of the fluid transfer element, which may also be referred to as top and bottom ends for example when the cartridge is held in the vertical position, instead of left- and right-hand sides of the fluid transfer element. Thus, the placement of the fluid transfer element does not depend on the placement of the connection plates, which allows for a quicker and more simplified construction process. Furthermore, larger tolerances can be accommodated during construction by not requiring the fluid transfer element to be placed between the two connection plates. Thus, the manufacturing process does not rely on precise placement of elements.

The first connection plate and the second connection plate may each comprise a slot configured to receive the first and second ends of the heating element respectively. This may provide a secure means of receiving, by the connection plates, the first and second ends of the heating element. Thus, the first and second ends of the heating element may be simply "slot" into place.

Each slot may extend along a longitudinal axis of the first and second connection plates. This ensures that each slot comprises a minimum depth such each of the first and second ends of the heating element can be securely received and retained within their corresponding slots.

Preferably, each slot has a width substantially equal to a diameter of the heating element. Each of the first and second ends of the heating element may therefore be completely received and retained within their corresponding slots, providing a secure connection between the connection plates and the heating element. In some alternatives, each slot may have a width that is smaller than a diameter of the heating element. In other alternatives, each slot may have a width that is larger than a diameter of the heating element.

Each of the first and second ends of the heating element may be attached to their corresponding slots. Typically, the first and seconds ends of the heating element will be attached to each slot by crimping or laser welding. In the case of laser welding, the slot may be slightly larger, for example wider, than the diameter of the heating element. This means that the first and second ends of the heating element can be easily inserted into their slots and the laser welding will seal any gap or space created as a result of the difference in size between the width (or diameter) of the slot compared to the width (or diameter) of the heating element. In the case of crimping, the slot may be slightly smaller, for example narrower, than the diameter of the heating element.

The first and second ends of the heating element may extend in direction substantially perpendicular to a longitudinal axis of the fluid transfer element. Each end of the heating element therefore extends in a direction substantially perpendicular to the direction of each slot i.e. substantially perpendicular to the longitudinal axis of the first and second connection plates. Advantageously, having the ends of the heating element perpendicular to the fluid transfer element reduces the likelihood of liquid from being transported along the heating element and towards the connection plates. This helps mitigate potential leakages from undesired liquid migration.

The first and second connection plates may each comprise a shoulder portion located along the length of the first and second connection plates. The shoulder portion may extend away from the main body of the first and second connection plates.

In some examples, the shoulder portion of the first connection plate may be located at a different position along the length of the first connection plate compared to the position of the shoulder portion of the second connection plate along the length of the second shoulder plate. In other examples, the shoulder portion of the first connection plate may be located at the same position along the length of the first connection plate compared to the position of the shoulder portion of the second connection plate along the length of the second shoulder plate. In both cases, the positions of the shoulder portions are measured from an edge of the contact plates.

The first and second connection plates may each comprise an end portion which extends in a direction perpendicular to a longitudinal axis of the fluid transfer element.

The end portion of the first connection plate may have a greater length than the end portion of the second connection plate. In this case, the length of the end portion is measured from the shoulder portion. Preferably, the difference in length between the end portion of the first connection plate and the end portion of the second connection plate may substantially correspond to the diameter of the fluid transfer element. In some cases the first and second ends of the heating element may heating element may both terminate on one side of a plane of the fluid transfer element. The two ends of the heating element may therefore be spaced apart from each other in both the x-direction and the y-direction, when the cartridge is held in a horizontal position. As a result of the differing lengths of the end portions of the connection plates, the two ends of the heating element may advantageously be simply "slot" into place during the manufacturing process. In other words, the ends of the heating element advantageously do not need to be bent or adjusted in any way in order to make sufficient contact with the connection plates.

In some cases, the end portion of the first connection plate may extend further away from the heating element than the end portion of the second connection plate. Again, this may allow the two ends of the heating element to be simply "slid" or "slot" into place during the manufacturing process, making assembly of the cartridge simple.

The first and second connection plates may be positioned at different heights, such that each slot has a bottom portion configured to receive a bottom portion of the heating element, and wherein the bottom portion of the first slot is in a lower position than the bottom portion of the second slot, when the cartridge is held in a horizontal position.

The difference in height between the bottom portion of the first slot and the bottom portion of the second slot may substantially correspond to the diameter of the fluid transfer element. Advantageously, this configuration may aid and simplify the manufacturing process because the two ends of the heating element do not need to be adjusted in order to form a connection with the connection plates. Instead, they may simply be inserted into the slots in the connection plates.

In use, the first and second connections plates may be bent to form an L-shape, each L-shape comprising a base portion and a main portion. The main portion of each L-shape may be provided with slot for receiving the heating element and the base portion may arranged as a contact surface to provide a connection to a pair of corresponding terminals in a main body of an electronic cigarette. Thus each single connection plate may provide the dual function of firstly providing a connection between the heating element and the connection plates, by receiving the ends of the heating element in the slot, and secondly providing a connection between the cartridge and the main body of the electronic cigarette. The overall number of components is therefore reduced and so the overall design is simplified.

The cartridge may comprise first and second apertures and the first and second connection plates may be located within first and second apertures. The first and second apertures may comprise first and second air inlet holes. The apertures may therefore act as air inlet holes as well as placeholders for the first and second connection plates. The apertures may therefore be considered as providing a dual function, which advantageously reduces the number of individual components that need to be provided. Furthermore, providing only one set of apertures which are able to carry out a dual function, instead of two separate pairs of apertures (one set acting as connection plate placeholders and the other set acting as air inlet holes), reducing the total number of apertures or holes that need to be provided in the cartridge. Reducing the overall number of apertures or holes present in the cartridge is important because it limits the number of potential locations in which a leak may occur. The overall cartridge device may therefore be less susceptible to leaks.

According to another aspect there may be provided an electronic cigarette comprising a cartridge as described above.

BRIEF DESCRIPTION OF DRAWINGS

Embodiments of the present invention will now be described by way of example only with reference to the accompanying drawings in which.

DETAILED DESCRIPTION

Figure 1A:
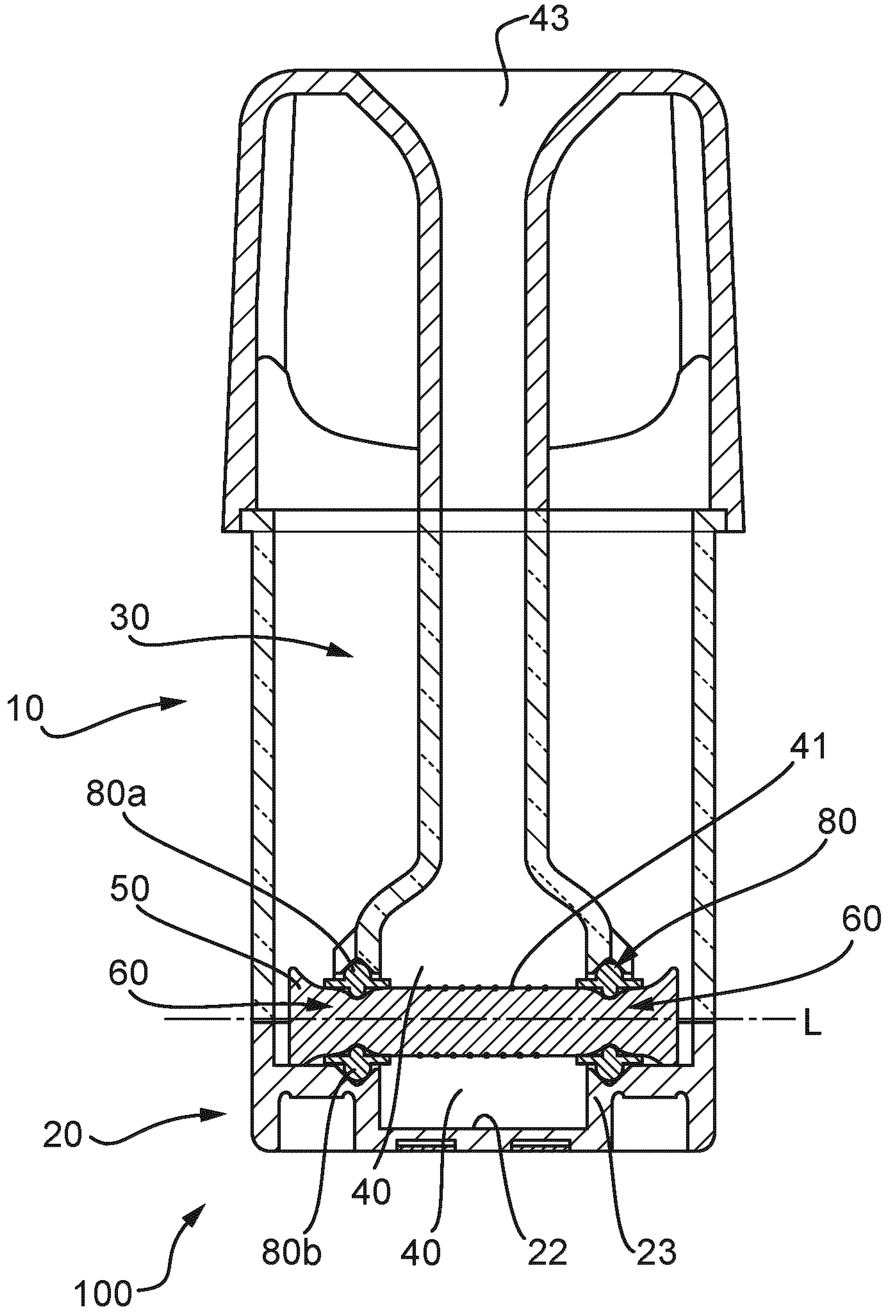
FIGS. 1A and 1B show a cartridge for an electronic cigarette comprising an annular seal.
Figure 1B:
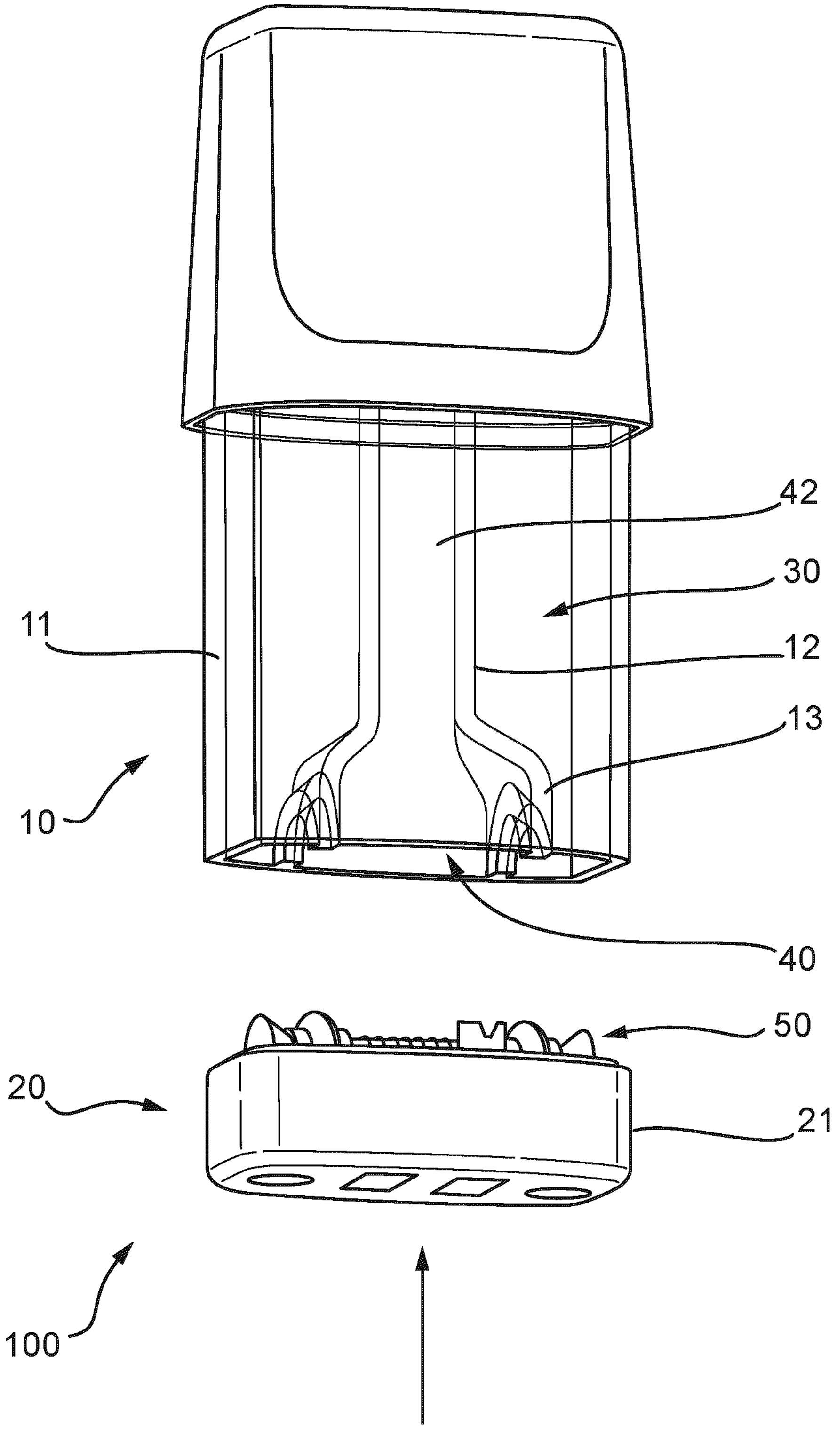

FIGS. 1A and 1B schematically illustrate a cartridge 100 for an electronic cigarette. The cartridge 100 includes a liquid store 30 arranged to contain a liquid to be vaporised and a vaporisation chamber 40, where the vaporisation chamber 40 has at least one opening 60 which connects the vaporisation chamber 40 to the liquid store 30. A fluid transfer element 50 extends between the liquid store 30 and the vaporisation chamber 40 and is supported within the opening 60. The fluid transfer element 50 is arranged to transfer liquid between the liquid store 30 and the vaporisation chamber 40 by capillary action. A heating element 41 is positioned within the vaporisation chamber 40 and is arranged to heat the liquid that is transferred by capillary action to the vaporisation chamber 40 by the fluid transfer element 50.

As most clearly shown in FIG. 1B the cartridge 100 comprises an upper housing portion 10 and a lower housing portion 20 which are configured to connect together around the fluid transfer element 50 to form the liquid store 30, the vaporisation chamber 40, and the at least one opening 60 connecting the vaporisation chamber 40 and the liquid store 30.

The cartridge 100 allows for a fluid transfer element 50 or "wick" 50 to be positioned so as to be tightly fitted within the opening 60 connecting the vaporisation chamber 40 and liquid store 30, thereby reducing leakage from the liquid store through the opening 60 into the vaporisation chamber 40.

Because the cartridge is formed of two housing components 10, 20 which fit around the fluid transfer element 50 to define the openings and the vaporisation chamber 40 and liquid store 30 when connected together, the fluid transfer element 50 may be positioned in a straightforward manner with the housing components closed around it, rather than requiring the fluid transfer element 50 to in some way be threaded into an opening within the housing. The cartridge 100 therefore allows for the wick 50 to be tightly fitted in the cartridge as well as improving the ease of manufacture.

Figure 2A:
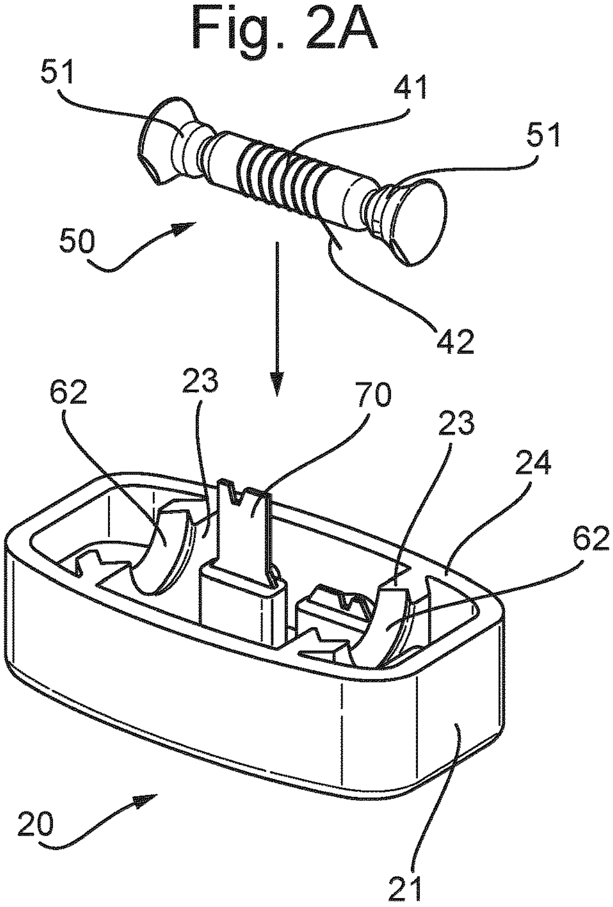
FIG. 2A shows a lower housing portion of a cartridge for an electronic cigarette and a fluid transport element without an annular seal.
Figure 2B:
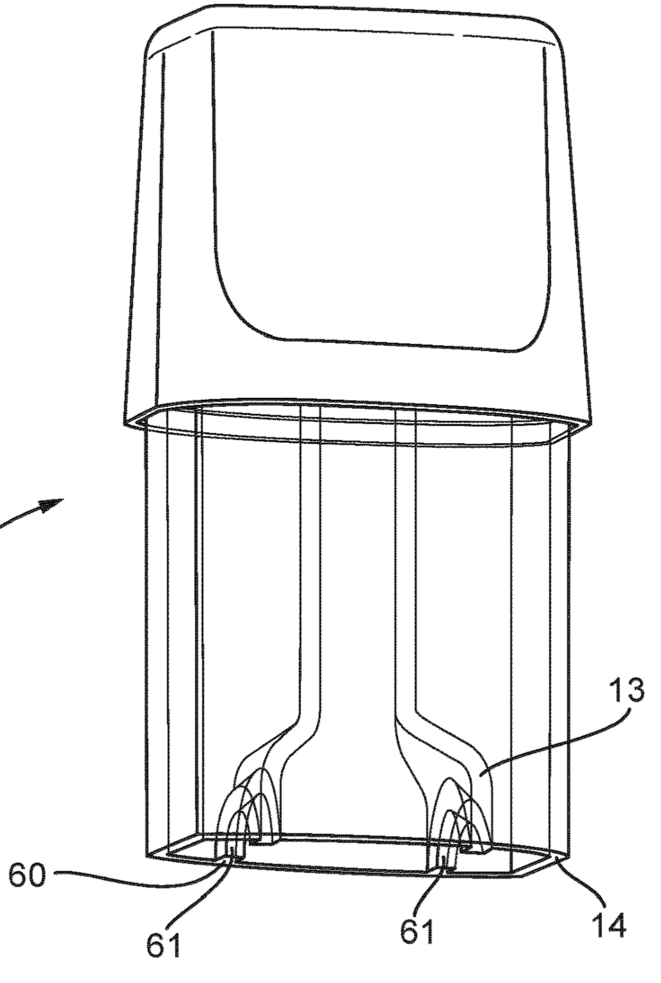
FIG. 2B shows an upper housing portion of a cartridge for an electronic cigarette.
Figure 2C:
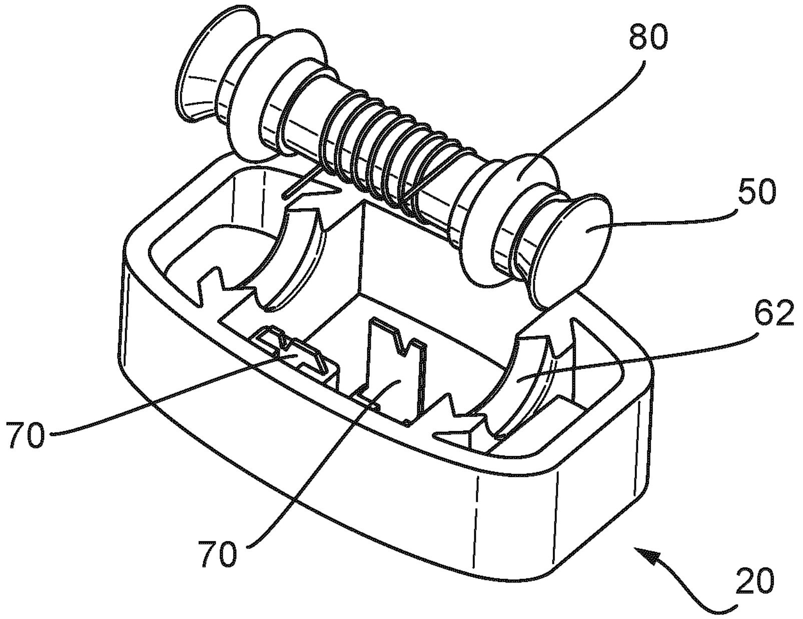
FIGS. 2C and 2D show a lower housing portion and a fluid transport element having an annular seal.
Figure 2D:
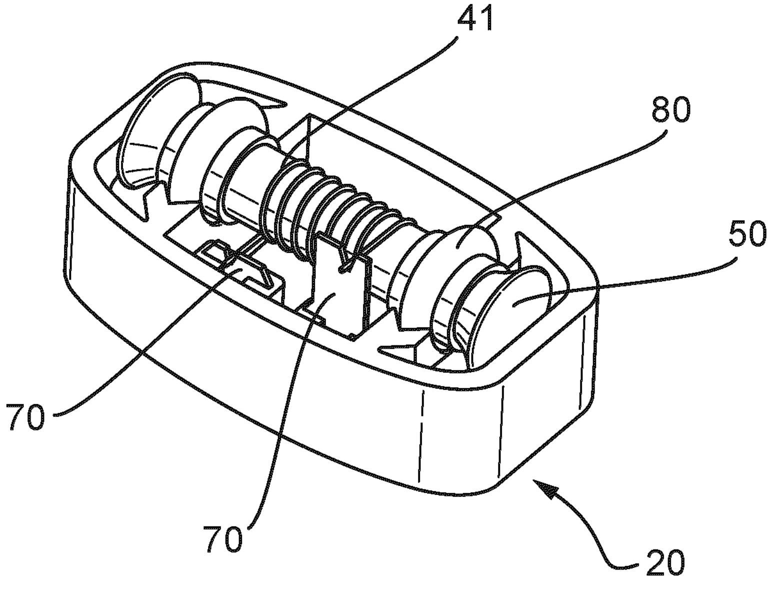

As shown in FIGS. 2A, 2C, and 2D the fluid transfer element 50 is in the form of a capillary wick 50 which may be formed for example by a bundle of fibres such as cotton fibres or another porous structure (e.g. such as a ceramic material) which is configured to transport liquid from the liquid store 30 through to the vaporisation chamber 40 via capillary action through the porous wick structure, driven by the evaporation of liquid from the centre of the wick by the heating element 41.

The two housing portions 10, 20 together form a central vaporisation chamber 40 and surrounding liquid store 30. In particular, as shown in FIG. 1B the upper housing portion 10 includes an outer wall 11 forming the outer boundary of the liquid store 30 and a number of internal walls 12, 13. In particular the upper housing portion 10 includes a tubular central wall 12 which defines a tubular air flow passage aligned along the elongate axis of the cartridge which leads from the vaporisation chamber 40 to an inhalation outlet 43 at a mouth end of the cartridge 100. The internal side wall 12 forming the inhalation passage 42 within the surrounding liquid store 30 extends radially outwards around the wick 50 and heater 41 to form the outer bounds of the vaporisation chamber 40 around the fluid transfer element 50.

As shown in FIG. 1B the internal walls 12, forming the air flow passage to the mouthpiece, are connected to the walls 13 of the vaporisation chamber 40. The internal vaporisation chamber walls 13 form part of the side walls and upper walls which define the upper portion of the vaporisation chamber 40 when the cartridge 100 is assembled.

The lower housing portion 20 comprises an outer housing wall 21 defining the outer bounds of the housing portion 20. As most clearly shown in FIG. 2A the lower housing portion 20 also has a number of internal walls 23 which, together with the internal walls 13 of the upper housing portion 10, form the internal walls defining the volume of the vaporisation chamber 40. In particular, the lower housing portion has an internal lower base wall 22, shown in FIG. 1A, and two internal side walls 23, as shown in FIG. 2A. As shown in FIG. 1A, the internal walls 13, 23 of the upper housing portion 10 and lower housing portion 20 fit together when the upper and lower housing portions 10, 20 are connected to define the outer bounds of the vaporisation chamber 40, within the internal volume of the cartridge 100 defined by outer side walls 11 and 21 of the upper and lower housing portions. In this way, the internal vaporisation chamber 40 is partially surrounded by the liquid store 30. In particular, the internal walls are shaped so as to provide a vaporisation chamber 40 centrally within the internal volume of the cartridge, with the volume of the liquid store defined at least partially around it extending down on at least two opposing sides of the vaporisation chamber 40.

As can be seen from the Figures two integral housing portions, i.e. the upper and lower housing portions 10, 20, together form the outer housing of the cartridge and each of the vaporisation chamber 40, liquid store 30, and the connecting openings 60. This configuration simplifies the assembly of the cartridge because the insertion of separate components within the outer housing to provide the vaporisation chamber is not required. Furthermore the alignment of components, which when not precisely achieved can lead to leakage, can be more accurately achieved by having fewer individual and separately installable components.

As shown in FIGS. 2A and 2B, the internal side walls 13, 23 provided by the upper 10 and lower 20 housing portions which define the vaporisation chamber 40 each comprise curved surfaces 61, 62 which together also form the opening 60 which connects the liquid store and heating chamber 40 when the housing portions are connecting together. In this way, the vaporisation chamber 40 is provided centrally within the internal volume of the cartridge 100 with two openings 60 within the side walls of the vaporisation chamber, which place the vaporisation chamber in fluid communication with the surrounding liquid store 30. As shown in FIG. 2A, the surfaces 62 which define the opening 60, support the ends 51 of the capillary wick 50, such that when the housing portions 10, 20 are brought together the ends 51 of the capillary wick are tightly received within the opening 60 formed by the surfaces 61, 62 as shown in FIGS. 1A and 1B.

As mentioned, the fluid transfer element 50 is an elongate capillary wick which extends across the internal volume of the heating chamber 40 with its opposing ends 51 received in the openings 60 within the internal side walls of the vaporisation chamber 40. In this way, when the housing portions are brought together as shown in FIG. 1B and the internal volume of the liquid store 30 is filled with liquid, the capillary wick fills the openings 60 such that the ends 51 of the wick are in communication with the liquid within the internal volume of the liquid store 30 and liquid is drawn into the vaporisation chamber 40 through the capillary wick 50 during heating. Since the openings 60 are formed by the opposing surfaces 61, 62 of two separate housing parts 10, 20 the construction of the cartridge 100 is simplified and a tighter connection of the opening 60 around the wick 50 can be achieved.

As shown, for example, in FIG. 2A, the heating element is a heating coil 41 which is coiled around the wick and has two ends 42 which extend out from the wick to contact first and second connection plates 70, which may also be referred to as first and second electrical contact plates 70. By providing power to the electrical contact plates 70 and subsequently to the heating element the current can be provided through the heating element to heat the electrical coil and vaporize a liquid transported from the liquid store 30 through the liquid transport element 50 within the vaporisation chamber 40.

In the example of FIG. 2A the capillary wick 50 is simply received within the opening 60 formed by the supporting surfaces 61, 62 of the upper 10 and lower 20 housing portions. FIG. 2A shows an example in which the capillary wick 50 does not include annular seals 80. In other examples, such as those illustrated by FIGS. 2C and 2D, the capillary wick 50 includes annular seals 80 and is again received within the opening 60 formed by the supporting surfaces 61, 62 of the upper 10 and lower 20 housing portions. In this case, the annular seals 80 are mounted in each opening 60 wherein the annular seals 80 are engaged around the fluid transfer element 50 such that liquid is restricted in passing through the opening 60 other than through the liquid transfer element 50. The annular seals 80 help to enhance the sealing of the opening around the capillary wick 50.

As shown in FIGS. 2A and 2B the upper housing portion and lower housing portion 20 contact each other around the perimeter of the cross section of the outer walls 11, 21 at corresponding contacting surfaces 14, 24. In particular, the upper and lower housing portions 10, 20 are brought together in the direction of the arrow in FIG. 1B such that the upward facing contact surface 24 of the outer wall 21 of the lower housing portion comes into contact with the opposing downward facing contact surface 14 of the outer wall 11 of the upper housing portion 10. These contacting surfaces may be attached by a number of different manufacturing techniques such as via an adhesive or ultrasonic welding. In some examples, this plane of connection defined by the opposing contacting attachment surfaces 24, 14 defines a plane of connection L shown in FIG. 1A which runs centrally through the elongate axis of the capillary wick 60. This aids in manufacture and allows the wick to be placed on the supporting surfaces and the opposing attachment surfaces bonded together to attach the housing portions 10, 20.

Figure 3A:
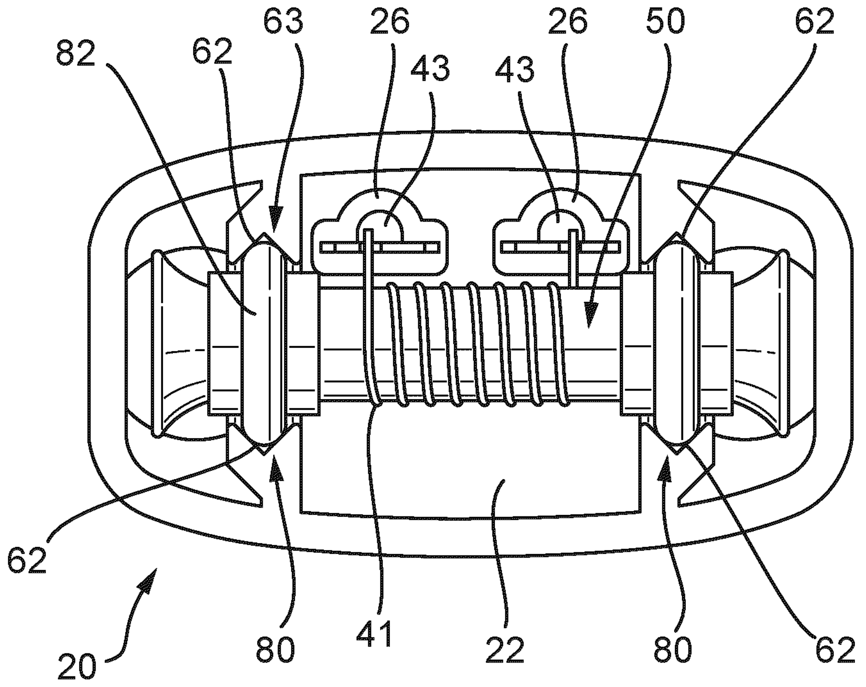
FIGS. 3A and 3B illustrate details of a lower housing portion and a fluid transport element.

FIG. 3A is a plan view of the liquid transfer element 50 received in the lower housing portion 20. As described above the coiled heating wire 41, coiled around the wick 50, is contacted to the contacting plates 70, as most clearly shown in FIG. 3A. In particular, there are two contacting plates 70 which extend upwards from the base surface 22 of the vaporisation chamber 40 provided by the lower housing portion 20.

Figure 4A:
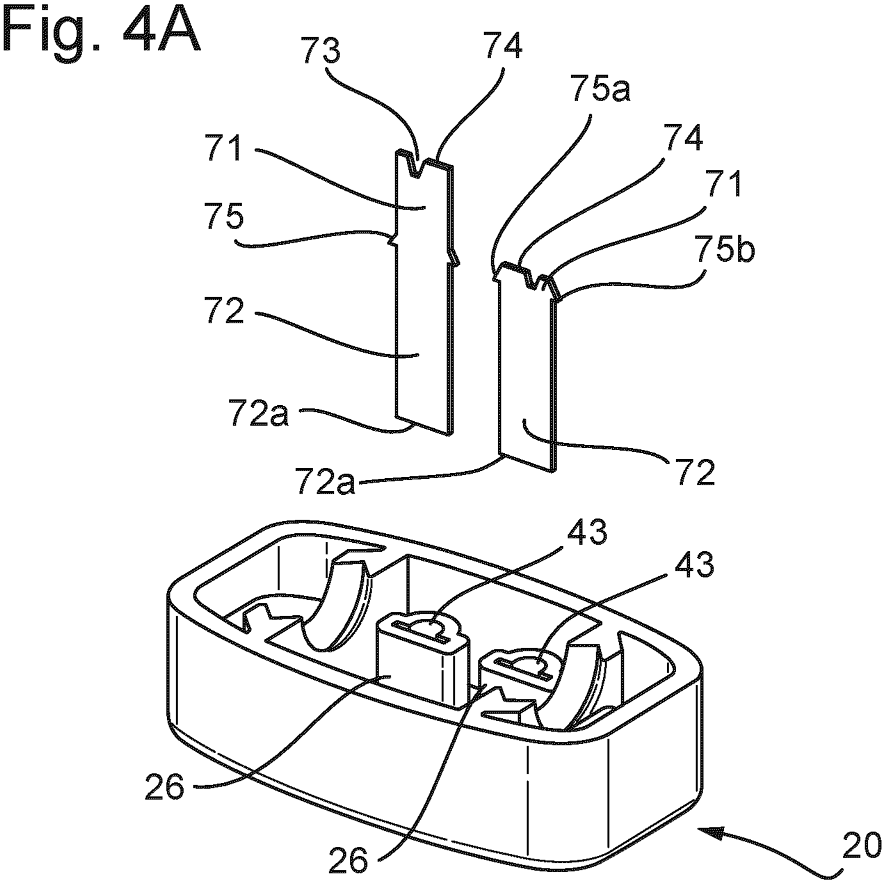
FIGS. 4A to 4E show contact plates within a lower housing portion.
Figure 4B:
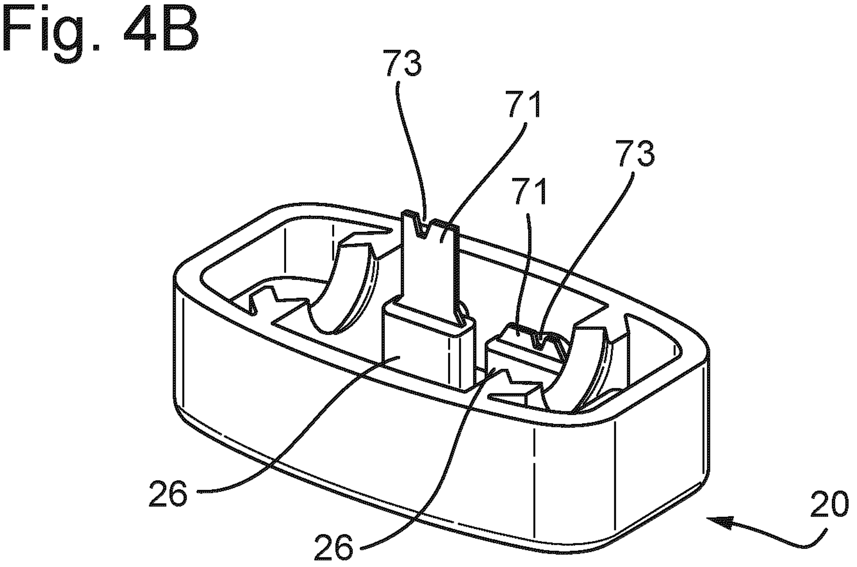

Each contacting plate 70 is formed by an upwardly extending portion 71 which extends upwards approximately perpendicular to the base surface 22 of vaporisation chamber 40 and a lower extending portion 72, as shown in FIG. 4A. As can be seen in FIGS. 3C and 4E, the lower extending portion 72 of each contacting plate 70 is folded so that it lies flat along an outer surface at the base of the lower housing portion 20. The contacting plates 70 are therefore folded to form a perpendicular arrangement with the upwardly extending portion 71, which is the top wire-contacting portion 71, extending through an opening in the lower housing portion 20 and folded to form the second base contact portion 72 lying flush along the base surface 25 of the lower housing portion 20. Thus, lower extending portion 72 extends in a direction substantially perpendicularly to the upwardly extending portion 71 such that an angle of substantially 90 degrees is formed between the upwardly extending portion 71 and the lower extending portion 72. In other words, the upwardly extending portions 71 of each of the contact pates 70 extends in a direction which is substantially perpendicular to a longitudinal axis of the fluid transfer element 50. In this way when the cartridge 100 is received in an aerosol generating device the lower extending portion 72, which is the base contact portion 72, of the contacting plates 70 may contact corresponding contacts which are connected to the battery to provide current through the contact plate 70 to the heating wire 41.

The structure of the contact plates 70 will now be described in more detail.

As can be seen in FIGS. 4A-4E the pair of contact plates 70 are arranged on a first side of the vaporization chamber 40, along a length of the vaporisation chamber 40. Both of the contact plates 70 are therefore on the same side of the vaporisation chamber 40. As seen in FIG. 3A, both contact plates 70 are also on the same side of the wick 50, rather than having one contact plate 70 on a first side of the wick 50 and the other contact plate 70 on the other side of the wick 50. This configuration allows for a more simplified cartridge 100 which is easier to construct. This is because the manufacturer does not need to worry about the size of the gap or the horizontal distance, between the first and second contact plates 70 in order that the wick 50 can be provided between the two contact plates 70. Here, horizontal distance is referring to a distance measured perpendicular to the longitudinal axis of the cartridge, when the cartridge is held in the horizontal position. Instead, the contact plates 70 are arranged to one side of the vaporisation chamber and the wick 50 is provided in a more central portion of the vaporisation chamber 40. Thus, the placement of the wick 50 does not depend on the placement of the contact plates 70, which allows for a quicker and more simplified construction process. Additionally, larger tolerances can be accommodated during construction by not requiring the wick 50 to be placed between the two contact plates 70.

Figure 4C:
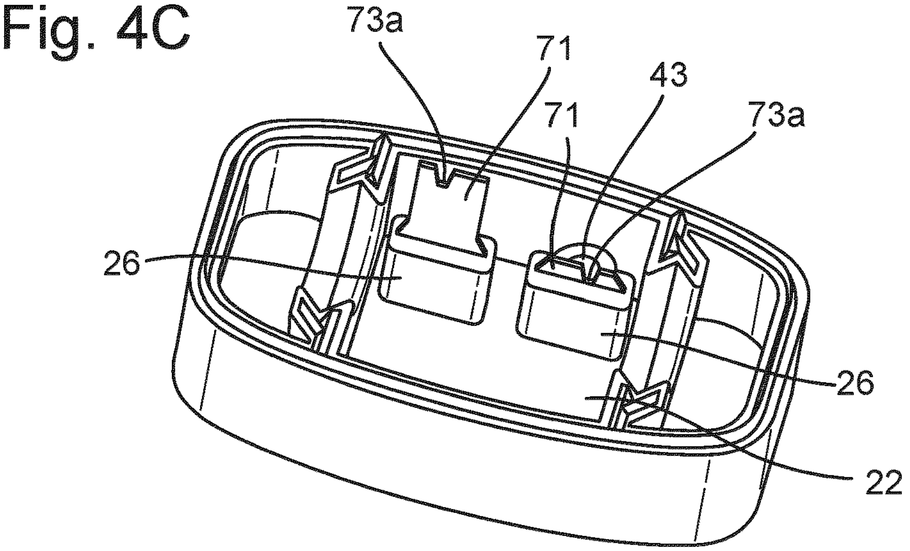

Each contact plate 70 comprises a slot 73 in the upper extending portion 71, as shown for example in FIG. 4C. Each slot 73 is located within an upper edge 74, or top edge 74, of each upper extending portion 71. In some examples the slots 73 are positioned off-centre along this top edge 74, for example as can be seen in FIG. 4A. By off-centre, we mean that the position of the slot is either side of a mid-point along the top edge 74. However, in other examples, the slots 73 could be located substantially centrally along the top edge 74.

The slots 73 extend inwardly towards the main body of the contact plates 70. In other words, the slots 73 extend along a longitudinal axis of the contact plates 70. The slot therefore creates a groove-like structure or recess within the top edge 74 of the contact plates 70.

Each slot is configured to receive the first and second ends 42 of the heating element 41 respectively, as shown in FIG. 3A. Typically, each slot 73 has a width substantially equal to a diameter of the heating element 41, allowing the ends 42 of the heating element to be received easily by the contact plate slots 73, and speeding up the construction process.

Once received by the slots 73, the two ends 42 of the heating element 41 extend in a direction substantially perpendicular to a longitudinal axis of the fluid transfer element, as shown in FIG. 3A. In other words, the two ends 42 of the heating element extend away from the main body of the cartridge, towards a side of the cartridge 100. This arrangement has the advantage that liquid is prevented from being transported along the wire 41 and arriving at the contact plates, from the wick 50, and so potential leakage from this type of undesired liquid migration is avoided.

The ends of the heating element 41 are then laser welded to the contact plates 70 to provide a secure connection point. In some examples, each slot 73 has a width that is smaller than a diameter of the heating element 41, allowing the ends 42 of the heating element 41 to be attached in the slots 73 by crimping.

Each of the contact plates 70 further includes a shoulder portion 75, which can be seen in FIG. 4A. The shoulder portion 75 takes the form of a protrusion which extends away from the main body of the contact plates 70 on either side of each contact plate 70. That is to say, the shoulder portion 75 comprises two parts, a first part 75*a* located on one length of the contact plate 70 and a second part 75*b* located on the other length of the contact plate 70. Thus, each contact plate 70 has a first and second part 75*a*, 75*b* forming a pair of shoulder portion parts. Each shoulder portion part extends substantially perpendicularly to the longitudinal axis of the contact plate 70.

As can be seen from the Figures, each part 75*a*, 75*b* in a pair of shoulder portion parts 75 is arranged at the same distance along the length of the corresponding contact plate 70. That is to say, the first part 75*a* and the second part 75*b* of the shoulder portion on one contact plate are located the same distance along either side, wherein the side is a length, of the contact plate 70. Similarly, the first part 75*a* and the second part 75*b* of the shoulder portion 75 on the other contact plate are both located the same distance along either side, which is again a length, of this contact plate 70.

It should be noted that whilst the two parts of one pair are located at the same position on a contact plate 70, the positions of each pair on each contact plate 70 compared to each does not have to be the same. Said another way, a first pair of shoulder portion parts 75 may be located at a first distance along the length of one of the contact plates 70 while the second pair of shoulder portion parts 75 may be located at a second distance along the length of the other contact plate 70, wherein the second distance is different to the first distance. This can be seen in FIG. 4A, which illustrates one pair of shoulder portions 75 part-way along the length of a contact plate 70 and another pair of shoulder portions 75 at one end of the length of the other contact plate 70.

Thus, typically, the shoulder portion 75 of the first connection plate 70 is located at a different position along the length of the first connection plate compared to the position of the shoulder portion of the second connection plate along the length of the second shoulder plate. However, in some examples, the shoulder portions 75 of both the first and second contact plates may be located at the same position along the lengths of the first and second contact plates 70.

It should be noted that by distance, or position, along the length of a side of the contact plate, we mean the relative distances as a percentage of the total distance of each side, rather than absolute. This is illustrated in FIG. 4A, wherein one shoulder portion is located a first distance which is less that 100% of the total length of the side, and the other shoulder portion is located at a second distance which is substantially 100% of the total length of the side.

The shoulder portion 75 acts to separate the upwardly extending portion 71 from the lower extending portion 72. This means that the location of the shoulder portion 75 along the length of each contact plate 70 has the effect of determining the relative lengths of the upwardly extending portion 71 and the lower extending portion 72.

As can be seen, for example in FIGS. 4B and 4C, the upwardly extending portion 71 of one of the contact plates 70 has a greater length i.e. is longer than the upwardly extending portion 71 of the other contact plate 70. However, the lower extending portions 72 of both contact plates have the same length. In this context, by length we mean absolute length. Thus, the difference in length of the upwardly extending portions 71 is partly because the absolute length of the two contact plates 70 is different from each other such that one contact plate 70 has a total length that is greater than the total length of the other contact plate 70. Additionally, the difference in length of the upwardly extending portion is as a result of the shoulder portions being positioned at a different proportion, or percentage, of the total length of the contact plates compared to each other. Looking at this another way, although the total length of each contact plate is different, the shoulder portions 75 are located at the same distance away from the bottom edge 72*a* of the lower extending portion 72.

As a result of the aforementioned difference in length of the upwardly extending portions 71, whilst the lower extending portions 72 are the same length, the upwardly extending portions 71 of the first contact plates 70 extends further away from the heating element 41 than upwardly extending portion 71 of the second contact plate such that the top edge 74 of the first contact plate 70 is further away from the heating element 41 than the top edge 74 of the second contact plate 70.

Another feature resulting from the difference in length of the upwardly extending portions 71 is that each slot 73 is effectively positioned at a different height, i.e. at a different distance from the heating element 41. Each slot 73 has a bottom portion 73*a*, shown in FIG. 4C, which receives the ends 42 of the heating element 41. These bottom portions 73*a* are therefore at different positions relative to the position of the heating element 41. In particular the bottom portion 73*a* of the first contact plate 70 is located further away from the heating element 41 than the bottom portion 73*a* of the second contact plate 70. Thus, the bottom portion 73*a* of the first contact plate 70 can be thought of as in a higher position than the bottom portion 73*a* of the second contact plate 70, when the cartridge 100 is held in a horizontal position.

Typically, the difference in length between the top edge 74 of one contact plate and the top edge 74 of the other contact plate 70 substantially corresponds to the diameter of the fluid transfer element 50. In general, when the heating element 41 is coiled around the fluid transfer element 50 one end of the heating element 41 will terminate on one side of a plane, for example a horizontal plane, through the centre of the fluid transfer element 50 and the other end of the heating element 41 will terminate on the other side of the plane. This has the effect that the two ends 42 will be spaced apart from each other in the vertical direction as well as the horizontal direction. The differing lengths of the upwardly extending portion 71 of the contact plates, resulting in the slots being positioned at different distances from the lower housing portion 21, means that the two ends of the heating element 21 can be simply "slot" into place during the manufacturing process. That is, the ends of the heating element 41 do not need to be bent or adjusted in any way in order to make sufficient contact with the contact plates 70.

Figure 3B:
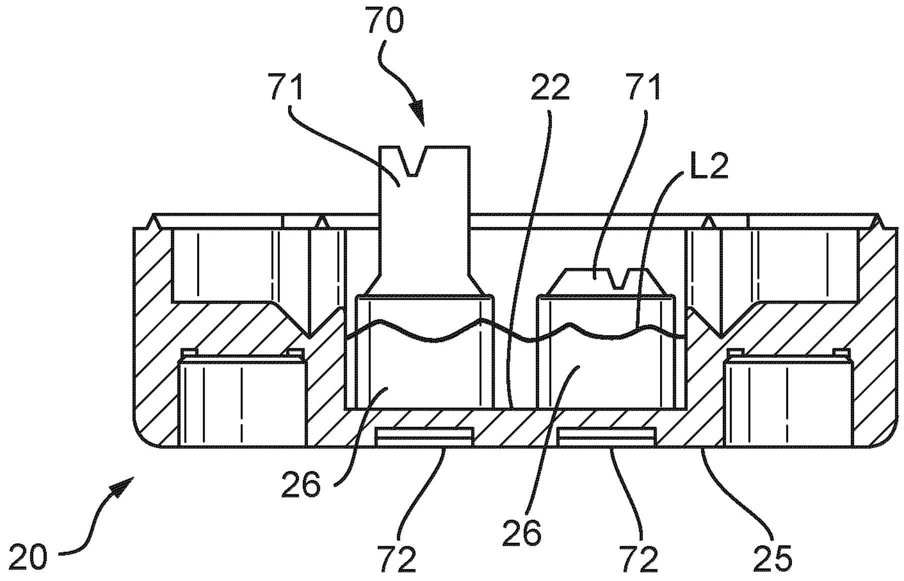

As shown in FIGS. 4B and 4C the upwardly extending portion 71 of the contact plate 70 extends through raised portions 26 of the lower internal surface 22 of the vaporisation chamber 40. In particular, the base surface is formed by the lower internal surface 22 of the lower house portion and this has two protruding platforms 26 which extend upwardly from the base surface 22 and the wire-contacting portion 71 of the contacting plates 70 emerge from holes within these raised platforms 26. By providing the contact plates 70 within raised platform portions 26 of the base of the vaporisation chamber 22, even if a small amount of liquid leaks passed the seal then this liquid will collect around the raised platforms 26 as shown by line L2 in FIG. 3B, and the liquid will not be in contact with the contact plates, which are acting as electrical terminals 70.

Air inlets 43 to the vaporisation chamber, shown in FIGS. 4A and 4C, are also provided through these raised platforms 26 such that, again, a liquid which leaks through the seals 80 is collected in the bottom of the vaporisation chamber 40 and so droplets from any leaked liquid cannot get into the vapour flow stream through the air inlet 43 as these are provided below the inlets 43 at the base of the vaporisation chamber. In this way, the sealing provided by the opening 60 around the wick 50, together with the raised platforms 26 means that the amount of liquid droplets reaching the air flow through the mouth piece is significantly reduced.

The shoulder portions 75 on each of the contact plates 70 prevent the contact plates 70 from slipping through the raised portions 26. Once the contact plates 70 have been inserted into their corresponding raised portion 26, each shoulder portion 75 rests on the outer surface of the raised portion 26, stopping the contact plate 70 from passing completely through the raised portion 26.

Figure 4D:
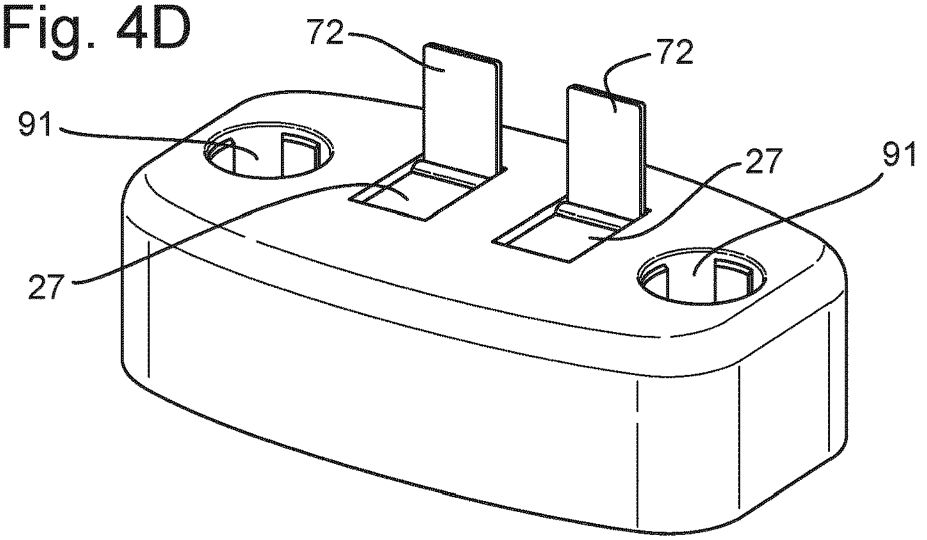
Figure 4E:
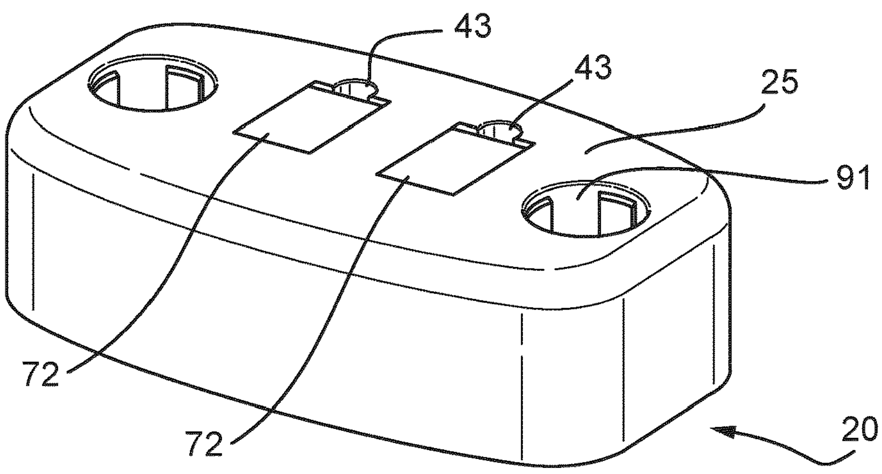

Once the contact plates 70 have been inserted into the raised portions 26 until the shoulder portions 75 come to rest on the raised portions 26, as shown in FIGS. 4B and 4C, the lower extending portion 72 of each contact plate 70 will project through the outer base surface 25 of the lower housing portion 20, as shown in FIG. 4D. As explained previously, the lower extending portions 72 are then folded so that they lies flat against the outer base surface 25 of the lower housing portion 20. The outer base surface 25 comprises two recesses 27, as shown in FIG. 4D, which are configured to receive the folded lower extending portions 72, as shown in FIG. 4E, so that the folded lower extending portions 72 lie flush along the base surface 25 of the lower housing portion 20.

Figure 5A:
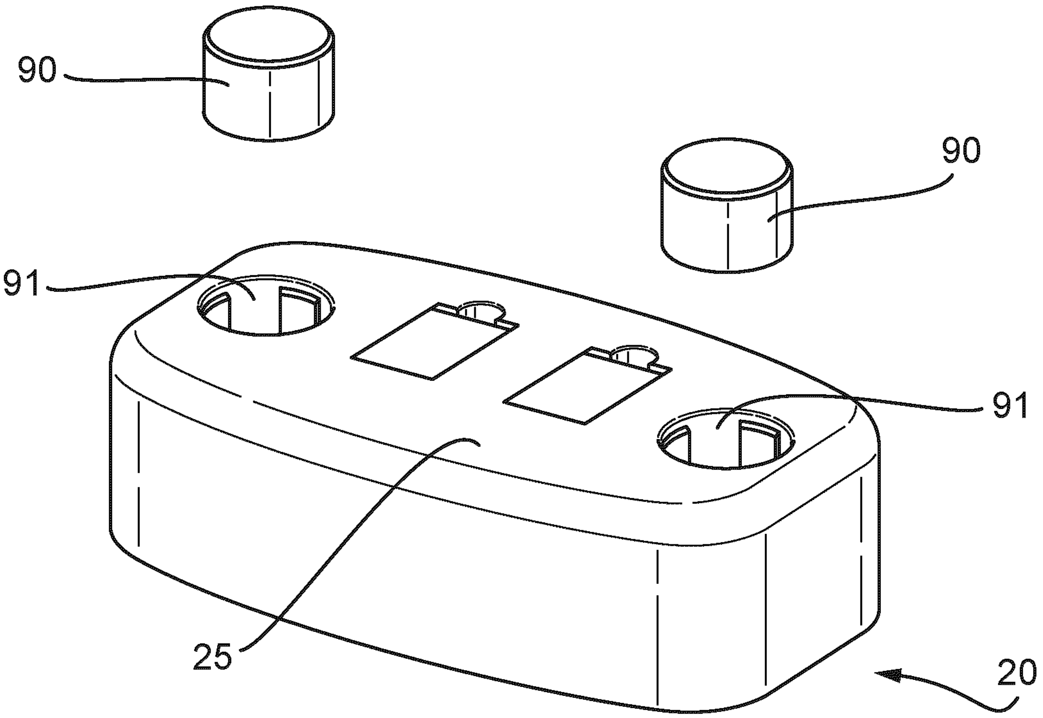
FIGS. 5A and 5B show further details of a lower housing portion.
Figure 5B:
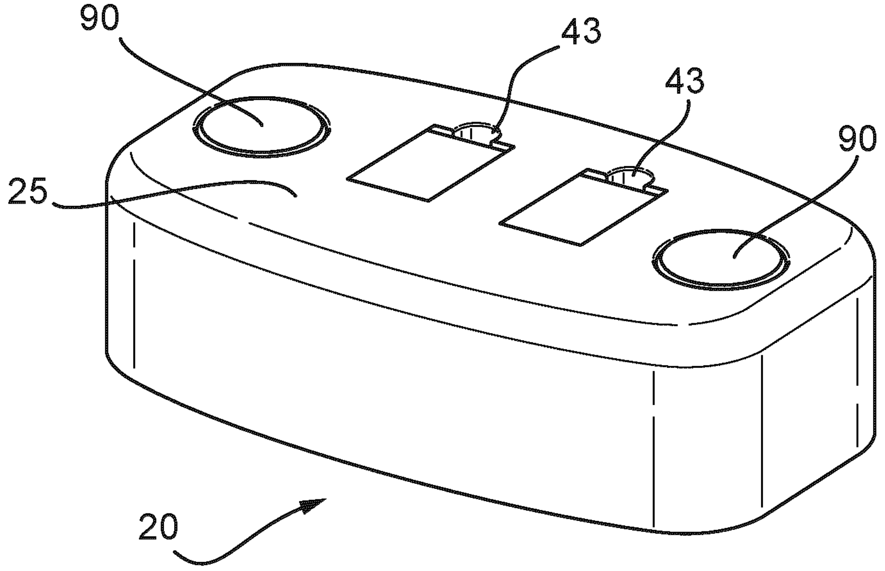

The base surface 25 of the lower housing portion 20 also comprises a pair of bores 91 located either side of the recesses 27, such that the pair of recesses 27 is located between the pair of bores 91, as shown in FIG. 5A. The bores 91 are sized to receive a pair of magnets 90, as shown in FIG. 5A. The bores are not through-bores and so each magnet 90 rests inside its corresponding bore such that the external surface of each magnet 90 lies flush with the base surface of the housing portion 20, as shown in FIG. 5B.

Figure 6:
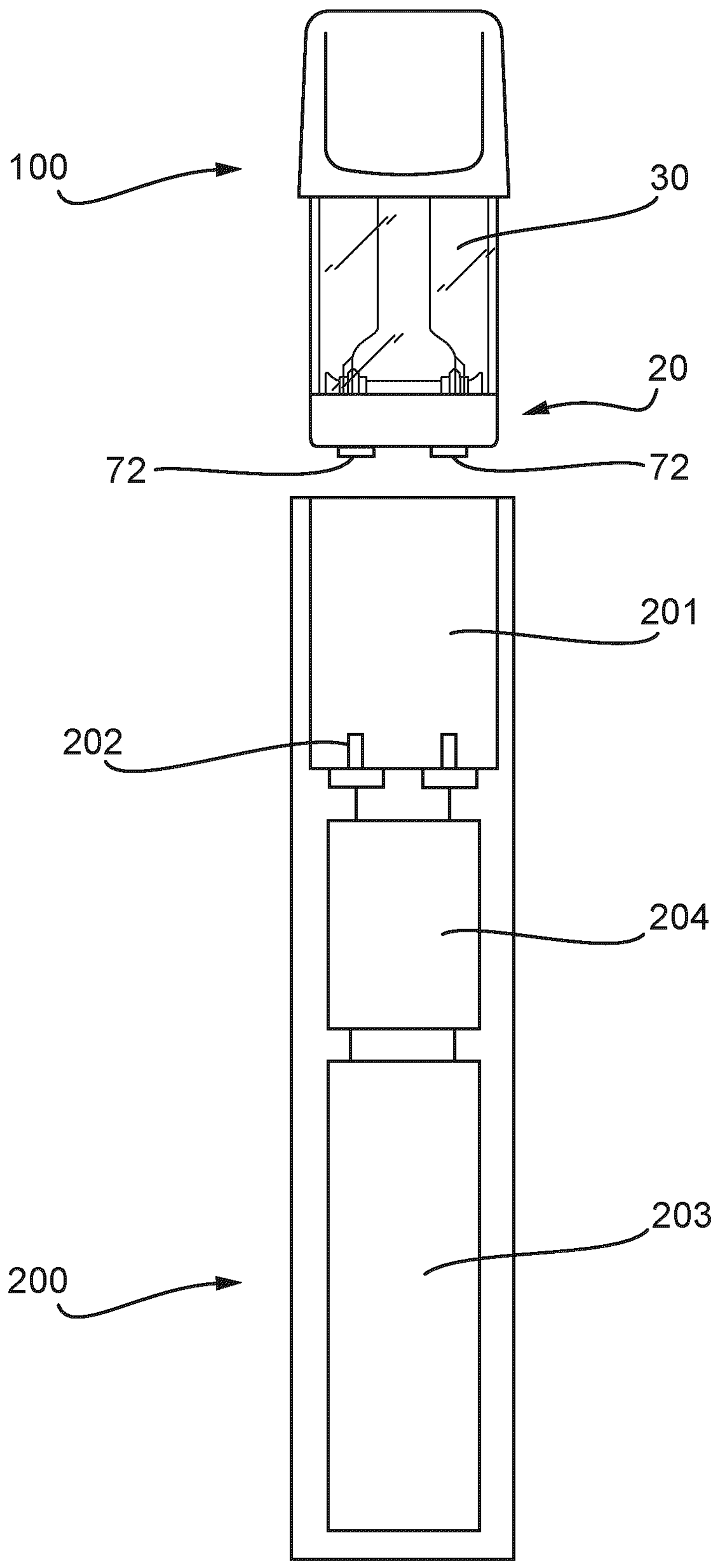
FIG. 6 illustrates an aerosol generating device configured to receive a cartridge according to the present invention.

As shown in FIG. 6 the cartridge 100 is configured to be received in the cartridge seating 201 of an aerosol generating device 200. The base contact portion 72 on the outer base surface 25 of the lower housing portion 20 contact corresponding contacts 202 positioned at the base surface of the cartridge seating 201. These contacts 202 may be spring biased such that they retract under contact back into recesses within the base of the cartridge seating 201. The bias ensures that there is a sufficient contact between the contact 202 of the aerosol generating device and the contacts 72 of the cartridge 100. In addition, the magnets 90 in the lower housing portion 20 are arranged to come into contact with a corresponding metal fixation point (not shown) on the cartridge seating 201. When the cartridge 100 is received in the cartridge seating 201, current provided by a battery 203 is provided to the contacts 72 and to the heating element 41 to vaporize liquid transported from the liquid chamber 30 to the vaporisation chamber via the liquid transport element 50. The supply of current can be controlled by control circuitry 204 to control the amount of current applied to the heating element 41.

The invention claimed is:

1. A cartridge for an electronic cigarette, the cartridge comprising:
- a liquid store arranged to contain a liquid to be vaporized;
- a vaporization chamber having at least one opening arranged to connect the vaporization chamber to the liquid store;
- a vaporizing unit comprising:
  - a fluid transfer element arranged to transfer the liquid between the liquid store and the vaporization chamber; and
  - a heating element arranged inside the vaporization chamber and arranged to heat the liquid transferred to the vaporization chamber by the fluid transfer element; and
- a pair of electric terminals connected to the heating element, wherein the pair of electric terminals comprise a first connection plate and a second connection plate which are connected to a first end and a second end of the heating element, respectively, and wherein the first and the second connection plates are arranged on a first side of the vaporization chamber,
- wherein the first connection plate and the second connection plate each comprise a slot configured to receive the first and second ends of the heating element, respectively, and
- wherein the first and second connection plates are positioned at different positions in a height dimension of the cartridge, such that a bottom portion of the first slot is in a lower position along the height dimension than a bottom portion of the second slot.

2. The cartridge according to claim 1, wherein the first and the second connection plates are arranged on a first side of the fluid transfer element.

3. The cartridge according to claim 2, wherein the first side of the fluid transfer element is along a longitudinal dimension of the fluid transfer element.

4. The cartridge according to claim 1, wherein each of the slots extends along a longitudinal axis of the respective first and second connection plate.

5. The cartridge according to claim 1, wherein each of the slots has a width substantially equal to a diameter of the heating element.

6. The cartridge according to claim 1, wherein each of the slots has a width that is smaller than a diameter of the heating element.

7. The cartridge according to claim 1, wherein each of the slots has a width that is larger than a diameter of the heating element.

8. The cartridge according to claim 1, wherein the first and second ends of the heating element extend in direction substantially perpendicular to a longitudinal axis of the fluid transfer element.

9. The cartridge according to claim 1, wherein the first and second connection plates each comprise a shoulder portion located along a length of the respective first and second connection plate, the shoulder portion extending away from a main body of the respective first and second connection plate.

10. The cartridge according to claim 9, wherein the shoulder portion of the first connection plate is located at a first distance along the length of the first connection and the shoulder portion of the second connection plate is located at a second distance along the length of the second shoulder plate, the first distance being different than the second distance.

11. The cartridge according to claim 1, wherein the first and second connection plates each comprise an end portion which extends in a direction perpendicular to a longitudinal axis of the fluid transfer element.

12. The cartridge according to claim 11, wherein the end portion of the first connection plate has a greater length than the end portion of the second connection plate.

13. The cartridge according to claim 12, wherein a difference in length between the end portion of the first connection plate and the end portion of the second connection plate substantially corresponds to a diameter of the fluid transfer element.

14. The cartridge according to claim 11, wherein the end portion of the first connection plate extends further away from the heating element than the end portion of the second connection plate.

15. The cartridge according to claim 1, wherein the first and second connections plates are each bent to form an L-shape, each of the L-shapes comprising a base portion and a main portion.

16. The cartridge according to claim 15, wherein the main portion of each L-shape is provided with slot for receiving the heating element, and wherein the base portion of each L-shape is arranged as a contact surface to provide a connection to a respective one of a pair of corresponding terminals in a main body of an electronic cigarette.

17. The cartridge according to claim 1, wherein the cartridge comprises first and second apertures, and wherein the first and second connection plates are located within first and second apertures, respectively.

18. The cartridge according to claim 17, wherein the first and second apertures comprise first and second air inlet holes, respectively.

19. An electronic cigarette comprising a cartridge according to claim 1.

* * * * *